United States Patent [19]

Hammer, Jr. et al.

[11] 4,250,356

[45] Feb. 10, 1981

[54] TELEPHONE CRADLE

[75] Inventors: Victor S. Hammer, Jr., Lake Zurich; E. Grant Swick, Bartlett, both of Ill.

[73] Assignee: Illinois Tool Works Inc., Chicago, Ill.

[21] Appl. No.: 44,441

[22] Filed: Jun. 1, 1979

[51] Int. Cl.³ ............................................. H04M 1/04
[52] U.S. Cl. .................................. 179/146 R; 179/178
[58] Field of Search ............ 179/1 HS, 100 R, 100 C, 179/100 L, 102, 103, 146 R, 147, 153, 178, 183, 184

[56] References Cited

U.S. PATENT DOCUMENTS

| D. 212,804 | 11/1968 | Blackman | D14/61 |
|---|---|---|---|
| 2,639,334 | 5/1953 | Fleming | 179/146 R |
| 2,782,261 | 2/1957 | Henrikson et al. | 179/146 R |
| 2,783,313 | 2/1957 | Sargisson et al. | 179/146 R |
| 2,924,671 | 2/1960 | Barry | 179/146 R |
| 3,005,061 | 10/1961 | Cagen | 179/146 R |
| 3,021,396 | 2/1962 | Nagel | 179/146 R |
| 3,150,239 | 9/1964 | Fielder, Jr. | 179/146 R |
| 3,334,196 | 8/1967 | Pearlman | 179/179 |
| 3,878,343 | 4/1975 | Van De Wall | 179/100 R |
| 3,956,600 | 5/1976 | Ray | 179/146 R |

Primary Examiner—Gerald L. Brigance
Attorney, Agent, or Firm—Thomas W. Buckman; Jack R. Halvorsen

[57] ABSTRACT

A one-piece plastic handset cradle attachment for a wall mounted telephone including integral retaining means for retention of the cradle relative to the telephone and means for guiding the handset and its associated cordset during hangup of the handset.

10 Claims, 4 Drawing Figures

TELEPHONE CRADLE

BACKGROUND OF THE INVENTION

Cradles and auxiliary cradles for serving a secondary function such as supporting a receiver without disconnecting the circuit is generally shown in the patent to Clarke U.S. Pat. No. 1,391,370. With the advent of combining the receiver with the transmitter into a single handset, having pronounced protuberances with generally tapered cylindrical shapes, produced a large number of hangers and cradles, for example, see the U.S. Letters Pat. Nos. to B. H. King 2,339,413; S. G. Sears 2,443,329; J. J. Fleming 2,639,334; W. V. Fielder, Jr. 3,150,239 and D. T. Ross 3,538,267. Each of these devices were dependent upon the large protuberance of the receiver and transmitter extending laterally from the joining hand-piece and relied heavily upon the area of contact available. With the introduction of the Trimline ® telephones designed by Bell Telephone Laboratories, of the type shown in the patent to S. W. Walden U.S. Pat. No. 3,557,322, the problems of controlling the proper usage of the telephone at the time of hang-up became more critical. These later telephones include a dial or tone buttons in the handset and damage to the handset resulted in a greater cost of repair and/or replacement. While the locking means discussed in the patent to Walden U.S. Pat. No. 3,557,322 is adequate when the device is utilized in the proper fashion, it functions well and its aesthetic appearance is pleasing to the eye, unfortunately, in many environments where there are teen-agers involved, where a patient in a hospital is attempting to hangup the telephone or in rough environments such as aboard ships or aircraft the limited area of contact at the receiver end has proven to be a deficiency.

SUMMARY OF THE INVENTION

The present invention relates to a one-piece plastic handset cradle attachment for a vertical panel or wall mounted telephone which can be quickly mounted to new installations as well as existing installations with this adaptability and ease of installation being a primary object of the present invention.

Another object to the present invention is to provide a cradle which is capable of readily accepting the transmitter end of a Trimline ® telephone handset and which will guide the telephone into position whereby the receiver end of the handset will engage the locking means or hook member which activitates the cut-off switch. A further object of the present invention is to provide a one-piece plastic handset cradle which can be economically manufactured in relation to other forms of cradles and which can be rapidly installed with a minimum of effort and thereby maintain the labor cost of installation at a low increment.

Other objects of the invention will become apparent when the description is read in conjunction with the drawings.

DETAILED DESCRIPTION

Figure 1:
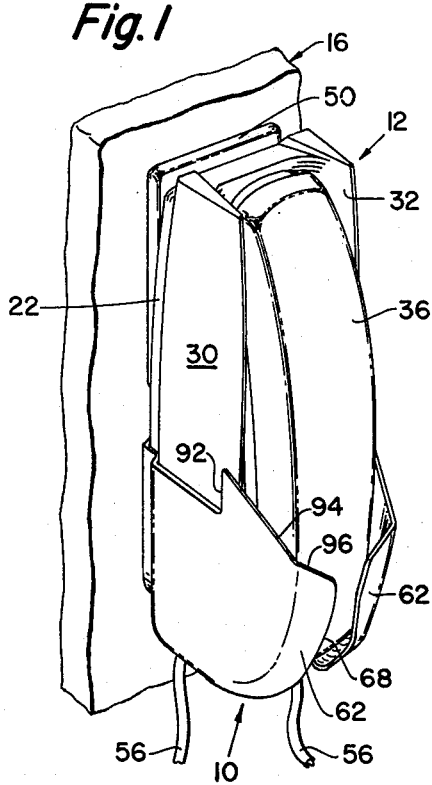
FIG. 1 is a perspective view of an embodiment of the present invention in an installed position in association with a wall mounted telephone and showing the handset in a captured hung up position.

Referring now to the drawings wherein similar parts are designated by similar numerals, a cradle 10 of the present invention is utilized with a telephone 12 mounted on a vertical support such as the wall 16. The telephone 12 includes an underlying member 18 having a base 20 and upstanding sidewall 22 in which there are located spaced slot 24 and 26 at the upper and lower regions thereof, respectively. The various elements making up the telephone such as the circuitry, the ringer and the switch mechanism are mounted on the underlying member 18 which then are covered by an encasing body 30 which is attached to and overlies the underlying member 18. The encasing body includes a recess 32 at its upper extremity and a hangup bar 34 projecting into said recess 32 as will be described hereinafter. The telephone, as exemplified in the present invention is of the type known as the Trimline ® telephone and includes a thin elongated handset 36 with the transmitter 38 at one end and a protuberance like receiver 40 at the opposite end. The receiver 40 has a shoulder means 42 extending angularly outwardly from the handset 36 and adapted to cooperate with the plunger 34 to retain the handset 36 in mounted hungup position. The encasing body 30 also may include sidewalls 44 for purposes of better capturing the handset when the receiver 40 is placed into recess 32. An additional recess is provided at the lower extremity of the encasing body 30, and not shown, for accepting the contour of the handset 36 adjacent the transmitting end 38.

The base 20 of the underlying member 18 is positioned and mounted substantially parallel to the wall support 16 and may, if desired, have interposed there between a flat plate-like member 50. One or more screws are introduced through the upper end of the underlying member 18 and an additional screw 52 is used at the lower extremity and penetrates a keyhole slot 54 for providing lateral stability to the base 20.

While the Trimline ® telephone design was a dramatic improvement over previous wall hung telephones the limited area of contact between the shoulder 42 and the switch bar 34 did not readily permit usage of this telephone design in harsh environments. Unless the handset 36 is accurately placed relative to the encasing body 30, there is a tendency when the phone is used by elderly people or young children to not cooperate in the retaining means area thereby resulting in frequent droppages of the handset 36. In the present instance such handset incorporate either a telephone dial or tone pushbuttons which add to the cost of the handset 36 and result in high cost of repair and replacement.

The present invention is directed to a solution to this problem, namely, a means to accurately retain the handset 36 to direct it to the position of engagement between the shoulder 42 and switch bar 34 and further to insure quick, positive location of the connecting cordset 56 which extends between the handset 36 and the mechanism carried by the underlying member 18.

Figure 3:
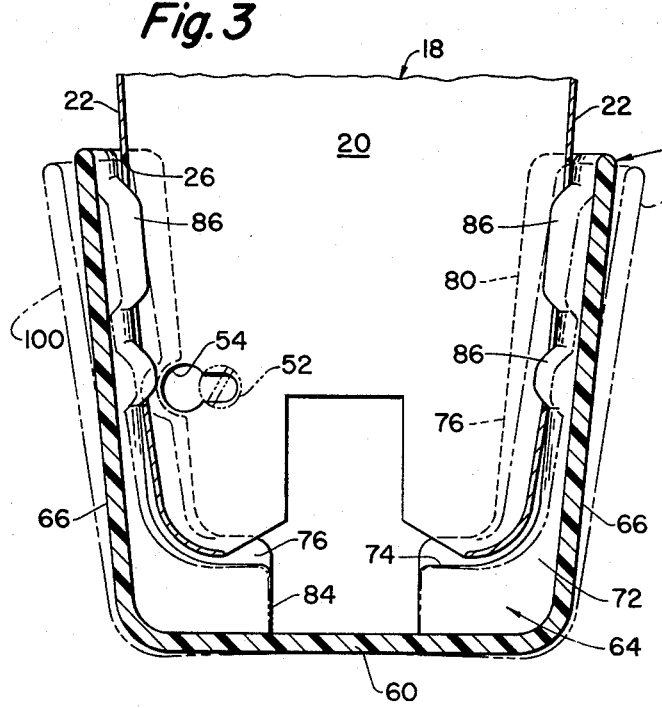
FIG. 3 is an elevational view in partial section of the basic mounting means for this type of telephone and showing the cooperative engagement of the cradle of the present invention with this back panel.
Figure 2:
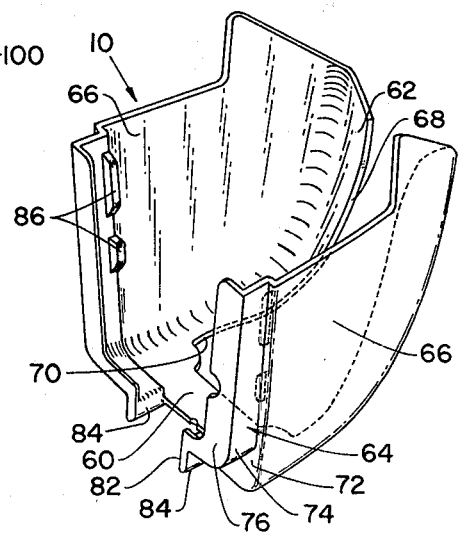
FIG. 2 is a perspective view of the cradle per se as viewed from the upper backside thereof.

A one-piece plastic handset cradle attachment can be best seen in FIGS. 2 and 3. Such a cradle 10 includes a bottom wall 60, a front wall 62, a back wall 64 and sidewalls 66. The front wall 62 and the bottom 60 are interrupted by a slot 68 which extends through all of the front wall 62 and a substantial portion of the bottom 60, in the present embodiment of slot 68 being widened substantially as it enters the bottom 60, as indicated at 70.

The back wall 64 includes a first part 72 extending generally perpendicularly to the sidewall 60, a second part 74 and a third part 76 which is parallel to the first part. This stepped configuration of the back wall and the opposed edges of the third portion 76 define a back slot 80 through a substantial portion of its extent along the vertical dimension of the sidewall 66 and a narrowed slot 82 formed by a pair of spaced opposed flanges 84 that extend vertically adjacent the bottom 60, for purposes best set forth hereinafter.

Extending inwardly from the back wall and particularly from adjacent the juncture of second portion 74 with first portion 72, are one or more retaining means 86 adapted to be accepted within the slot 76 at the lower end of the side flanges 22 of the base panel 18. The axial spacing of the two ribs 86, as shown in FIG. 2, has the opposite edges thereof spaced apart a distance substantially equal to the axial opening of slot 26 in the side flanges 22 of base panel 18. The protuberances or ribs 86 are positioned, mirror image along the opposed second portion 74.

Each of the sidewalls also includes a generally triangular shaped extension 90 having a vertically disposed edge 92 and a tapered edge 94 which joins the juncture of the sidewall 66 with the front wall 62. The upper edge 96 of the front wall 62 is also tapered from that juncture point down to the mouth of the slot 68, for purposes best set forth hereinafter.

Figure 4:
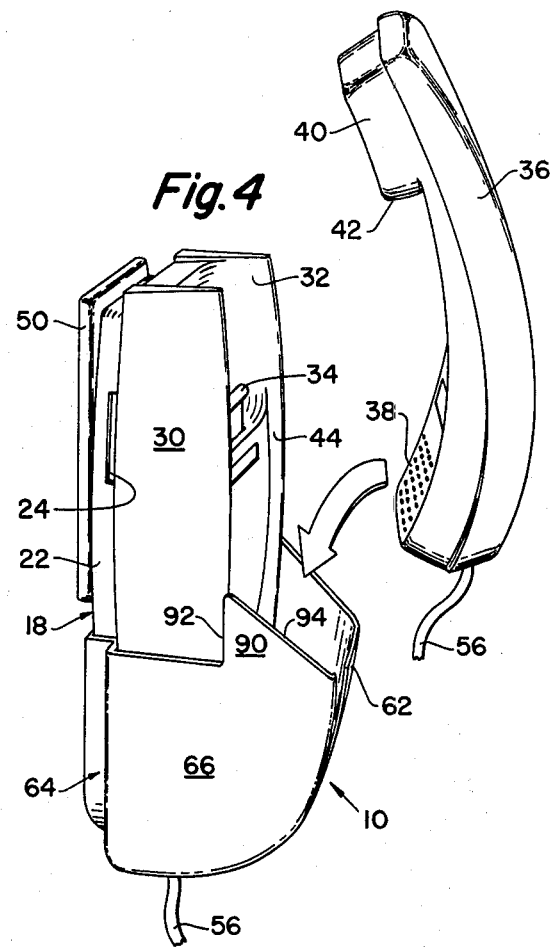
FIG. 4 is a perspective view, without the portion of the wall shown in FIG. 1, showing the cradle in mounted position on a telephone and showing the handset in the process of being introduced into the cradle.

As can be best seen in FIGS. 1, 3 and 4, the cradle contemplated in the present invention has its forward walls generally curved both interiorly and exteriorly to conform to the shape of the lower end of the handset 36. The sidewalls 66 are generally spaced apart a distance substantially complimentary to the sidewall spacing of the encasing body 30 while the lateral spacing of the second portion 74 of the backwall 64 is substantially identical to the spacing of the flanges 22 of the base plate 18. To make use of the cradle the sidewalls 66 are flexed away from one another by a slight bending of the bottom 60, as shown in the broken lines in FIG. 3. The cradle is then moved axially relative to the base panel 18 with the back portion 76 of stepped back wall 64 being caused to underlie the base panel 18, the second portion 74 to embrace the flanges 22 and with axial movement being completed when the second portion 74, adjacent the bottom 60 is brought into lower juxtaposition with the base panel 18 and the ribs or protuberances 86 snap into the slots 26 on opposite sides thereof. When the cradle reaches this mounted position, as seen in FIGS. 1 and 4, the vertical edge 92 of each of the extensions 90 is disposed adjacent to but rearwardly of the forward edge of the encasing body 30, the space within the cradle 10 as defined by the encasing body 30 and the forward wall 62, is generally equal to the spacing or thickness of the handset 36 at its lower end when it is positioned within the recess of the sidewall 44 of the encasing body 30.

The lower slot 82, as defined by the flanges 84, is generally aligned with suitable mechanism mounted on the base panel 18 to permit the terminal end of the cordset 56 to be plugged in and protected by said flanges 84.

When the handset 36 is to be introduced into the cradle, as indicated by the arrow in FIG. 4, the sloping edges 94 of the extensions 90 and the upper edge 96 of the front wall 62 insure that the cordset 56 is guided forwardly into the slot 68 located in front wall 62 and lead downwardly into the enlarged portion 70 of slot 68 so that the phone handset 36 can smoothly move into the interior of the cradle 10. As the handset 36 moves into the cradle 10 its contoured cooperating shape insures that the shoulder 42 will engage the bar 34 for activation of the cutoff switch. It has been found that the handset can be inserted angularly from virtually any attitude as long as it is the transmitter 38 end of the handset 36 that is placed within the cradle opening. No bunching of the cordset 56 is experienced due to the direction guiding means defined by the extensions 90 and its cooperating slope 94 and 96. The device can be readily utilized with new installations as well as existing installations and takes advantage of the flexibility of the injection molded plastics from which it is formed to permit the flexing of the sidewall 66, as shown by the broken line 100 to permit the resilient snap engagement of the protuberance rib 86 with the slot 26.

Other forms of the invention will be appreciated by those skilled in the art. I claim:

1. A one-piece plastic handset cradle attachment for a wall mounted telephone having a base panel and housing, said cradle including a bottom with front, back and sidewalls extending upwardly therefrom, slot means in said front and back walls, said panel, said base panel of said telephone having at least a portion thereof spaced from said wall, said back wall of said cradle having a portion thereof adapted to underlie said telephone base panel, said back wall of said cradle being stepped and contoured to embrace the telephone and back panel, integral retaining means adapted to cooperate with said base panel for retention of said cradle, the stepped portion of said back wall carries said retaining means which include a plurality of protuberance means complementary to and acceptable within apertures in said back panel, said cradle being resiliently expandible to permit mounting thereof on said telephone, said back wall slot being substantially wider than said front wall slot, said side and front walls in mounted position extending forwardly of said telephone housing and contoured interiorly to accept one end of said handset, and means for guiding the handset cord during the hand-up of the handset.

2. A device of the type claimed in claim 1 wherein said slot means in said front wall extends into said base.

3. A device of the type claimed in claim 1 wherein the portion of said sidewalls extending beyond said telephone each include a tapered extension extending axially away from said base with the high point being positioned adjacent said telephone and tapering downwardly to the juncture with said front wall to serve as said guide means for the handset and its connecting cord.

4. A device of the type claimed in claim 3 wherein the upper edge of said front wall from its junctures with said sidewall extensions tapers inwardly to its merger with said slot to further serve as said handset cord guide means to thereby insure positioning of said cord within the lower extremity of said slot and thereby eliminate interference or hangup of said cord with the acceptance of said handset within said cradle.

5. A device of the type claimed in claim 1 wherein said stepped back wall includes a first portion extending inwardly from said sidewalls adapted to underlie the housing for said telephone, a second portion extending parallel to said sidewalls to embrace a flange of said backpanel and a third portion extending inwardly to form the margins of said slot and underlies said backpanel, said second portion carrying said retaining protuberance means thereon.

6. A device of the type claimed in claim 5 wherein said backwall of said cradle adjacent said bottom is also provided with similar stepped portions for cooperative embracement and underlying of said telephone housing and back panel flanged slot means in said bottom stepped portion extending inwardly from said backwall and which is centrally located to accommodate the connection at one end of the connecting cordset to the telephone, said slot in said front wall extending into said bottom and the other end of said cordset attached to said handset being acceptable within the slot in said front wall and bottom.

7. A one-piece plastic supplemental cradle in combination with a wall supported telephone and handset wherein said wall supported telephone includes an elongated underlying member and an encasing plastic body, said underlying member having a base provided with means for mounting same in parallel spaced relation to a vertical wall, apertured sidewalls extending from said base, said encasing plastic body attached to and overlying said underlying member with the back edges thereof being in spaced relation to said vertical wall, said encasing plastic body including a recess having a linearly moveable hook disposed at its bottom end adapted to cooperate with the single protrusion on the handset located at the receiver end of the handset, said supplemental cradle including a bottom and front, back and sidewalls extending upwardly therefrom to form an open ended container adapted to accept the transmitting end of said handset, slot means in said front and back walls communicating with said open end, the margins of said back wall defining its associated slot means being substantially complimentary to said underlying member and encasing body with said side walls of the cradle embracing said encasing body over a substantial portion of its length opposite said recess, means for retaining said cradle in releasable mounted relation to said underlying member, said side and front walls of said cradle extending outwardly beyond said encasing body a distance adequate to freely accept a substantial portion of the transmitting end of said handset therein, and means for guiding a cord interconnecting said handset with said telephone into said slot in said front wall.

8. A cradle of the type claimed in claim 7 wherein said back wall includes a stepped configuration having two spaced interconnected flange-like portions adapted to engage and underlie the edges of said encasing body and the surface of said underlying member facing said wall.

9. A cradle of the type claimed in claim 8 wherein the means interconnecting said flange-like portions carries at least one protuberance complimentary to and engageable with said apertured sidewall of said member.

10. A cradle of the type claimed in claim 7 wherein said side walls extending outwardly beyond said encasing body each include a tapered extension extending axially away from said base with the high point positioned adjacent said telephone and tapering downwardly to the juncture with said front wall and adapted to serve as means to guide said cordset into said front wall slot.

* * * * *